United States Patent
Esch

Patent Number: 5,822,957
Date of Patent: Oct. 20, 1998

[54] EQUIPMENT FOR SHEATHING HAY BALES IN PLASTIC

[75] Inventor: Ivan B. Esch, Lancaster, Pa.

[73] Assignee: Hay Bale, Inc, Leola, Pa.

[21] Appl. No.: 908,267

[22] Filed: Aug. 7, 1997

[51] Int. Cl.[6] .............................. B65B 1/24; B65B 63/02
[52] U.S. Cl. .............................. 53/529; 53/540; 53/567; 53/576; 100/232
[58] Field of Search .............................. 53/529, 530, 540, 53/567, 576; 100/188 R, 232, 242; 414/789.7, 790.3, 907

[56] References Cited

U.S. PATENT DOCUMENTS

| | | | |
|---|---|---|---|
| 3,382,643 | 5/1968 | Hullhorst et al. | 53/540 X |
| 3,499,261 | 3/1970 | Hullhorst et al. | 53/529 X |
| 3,590,731 | 7/1971 | Nichols | 100/232 X |
| 3,824,759 | 7/1974 | Finn et al. | 53/540 X |
| 3,908,539 | 9/1975 | O'Brien | 53/540 X |
| 3,977,155 | 8/1976 | Spaulding | 53/529 X |
| 4,094,130 | 6/1978 | Kelly et al. | 53/529 |
| 4,158,994 | 6/1979 | Jensen | 100/3 |
| 4,172,414 | 10/1979 | Klinner et al. | 100/250 X |
| 4,182,237 | 1/1980 | O'Brien | 53/529 X |
| 4,263,844 | 4/1981 | Hacking | 53/529 X |
| 4,334,466 | 6/1982 | Spiegelberg | 100/250 X |
| 4,501,107 | 2/1985 | Piotrowski | 53/529 X |
| 4,602,472 | 7/1986 | Ampolini et al. | 53/529 X |
| 4,679,379 | 7/1987 | Cassoli | 53/540 X |
| 4,763,574 | 8/1988 | Ast | 100/7 X |
| 4,833,863 | 5/1989 | Scott et al. | 53/529 X |
| 5,001,974 | 3/1991 | Gombos | 100/4 |
| 5,090,177 | 2/1992 | Gombos et al. | 53/435 X |
| 5,175,981 | 1/1993 | Gombos et al. | 53/529 X |
| 5,392,591 | 2/1995 | Simpson | 53/530 X |
| 5,433,058 | 7/1995 | Peterson | 53/556 X |
| 5,619,842 | 4/1997 | Brubaker et al. | 53/529 X |

*Primary Examiner*—Daniel Moon

[57] ABSTRACT

Machine for arranging a plurality bales of hay into a compressed, contoured stack to be covered with protective plastic. The machine has top and side pressure plates which engage a stack of bales and compress the stack while convexly contouring the periphery.

29 Claims, 12 Drawing Sheets

EQUIPMENT FOR SHEATHING HAY BALES IN PLASTIC

This application is submitted on an even date with a related application titled METHODS FOR SHEATHING HAY BALES IN PLASTIC, Ser. No. 08/908,268.

This invention relates to the field of agriculture and more specifically to equipment for stacking and compressing small rectangular bales of hay, and thereafter sheathing a number of compressed stacks in plastic.

It is common practice for bales of hay to be stored in a plastic sheath as a means for preserving the nutrients and food value for long periods of time. Typically, an elongated plastic tube of the order of 100-feet long is folded accordian style and affixed in an open condition to the discharge chute on the rear of a bale bagging machine. Bales of hay or the like are then forced into the open tube so as to form a tight fit between the tube and the bales. The machine is then moved forward and the plastic tube is payed out from the accordian folds so as to make space for the next bale to be inserted. This process is repeated until the tube is filled from end-to-end. The end of the tube is then gathered and tightly sealed.

It is well known in the art to store large round bales of hay and the like in a plastic sheath in which the bales are wrapped with a thin self adhesive plastic film. In this wrapping technique the round bales are typically spun about their horizontal axis while a roll of plastic film circles the bale, thereby dispensing the plastic in a spiral overlapping pattern. The wrapping forms a tight covering with very little air trapped inside the sheath.

It is important that excess air be kept from the interior of the plastic sheath, both during the loading process and during the storage phase. Excess air can cause the hay to mold and thereby become useless as animal feed. Therefore it is important to obtain good conformance between the hay bales and the plastic, and to pack the bales tightly together so as to prevent the trapping of air therebetween.

It is also known in the art to insert round bales of hay into an elongated plastic tube, so as to form a long line of bales placed end-to end. The plastic tube is stretched in circumference while on the machine so as to achieve a tight fit with the enclosed hay bales.

In addition to storing round bales of hay in elongated plastic tubes, it is also desirable to place smaller, generally rectangular bales within elongated plastic tubes. There have been many attempts to store stacks of these smaller bales in plastic tubes, but there have been many losses due to molded hay, caused primarily by the presence of excess air trapped within the tube at the time of bale insertion.

Thus, one objective of this invention is equipment for compressing a stack of small rectangular bales and then sheathing the stack in plastic in which excess air in prevented from being trapped within the sheath.

Another object of this invention is to provide equipment which can sheath the compressed stacks of bales in plastic by either inserting the stacks into an elongated plastic tube or wrapping the compressed stacks with plastic film which is dispensed from a roll as the roll is made to circle the compressed stacks as they exit the machine.

One desirable feature of rectangular bale sheathing equipment is that it be transportable over public roads in moving from site to site. This feature places restrictions on the equipment width and height, and it is therefore challenging to the inventor to conceive an equipment assemblage to sheath a wide stack of bales in plastic while keeping the equipment roadworthy.

Therefore, it is an objective of this invention to keep the equipment width within acceptable limits, while being able to fill a wide plastic tube with rectangular bales which are stacked in a configuration which fills the plastic tube tightly.

Another desirable characteristic of bale sheathing equipment is sheathing speed, measured in bales per hour.

Another object of this invention is to provide equipment capable of sheathing about 500 bales per hour, while maintaining the plastic sheath free of excess air.

It is further desirable that the equipment be capable of forming stacks of compressed bales of hay from the individual bales and forcing the stacks into a delivery chute, and either ejecting the compressed stacks from the delivery chute into a plastic tube, or wrapping the compressed stack in self adhesive film as the bales exit the delivery chute. When the stack of compressed bales are wrapped as they emerge from the delivery chute, there is good conformance between the plastic sheath and the enclosed film, and very little air is enclosed. The long term yield of nutritious animal food is thereby significantly improved.

The disclosed methods and apparatus solves the prior art problems associated with sheathing rectangular bales of hay in plastic; the undesirable trapping of excess air in the plastic sheath along with the inserted bales. By preventing excess air entrapment the likelihood of hay spoilage due to mold is greatly reduced. Thus, the invention includes a compression chamber in which the individual bales of hay are stacked. Even though the individual bales are already tightly compressed and bound with twine when placed in the stack, the invention includes the provision for further compressing the stacked bales and forming the stack into a generally circular convex cross sectional shape, referred to herein as a convex surface. A convex cross section provides a tight fit with the plastic tube or plastic wrap and thereby prevents sealing in excess air.

A novel cam-and-link mechanism is used to compress the stack of bales on the sides by a vertically mounted hydraulic cylinder, so as to keep the overall equipment width to a minimum, and to save on the number of hydraulic cylinders required. The compression step thus forms the stack into a suitable shape and size so as to fit tightly within the opening of the plastic tube, and which can be wrapped in plastic film without excess air inclusion within.

Another novel aspect of the invention utilizes a short hydraulic cylinder to advance the ejector plate through a distance which is approximately twice the cylinder rod extension distance. This is accomplished as follows: When the last stack is to be cleared from the delivery chute the ejector hydraulic cylinder rod is first advanced to thereby move the stack of compressed bales into the delivery chute. The hydraulic cylinder body is then pulled to a rearward locked position and the cylinder rod is extended again to thereby move the stack through the delivery chute. Additional novel aspects of the invention are the use of some parts for multiple purposes. The compression chamber for example has a forward face which includes a large pivoting plate, referred to as the tread plate which is repositioned so as to serve as a walkway which the operator uses when loading the bales into the compression chamber. Similarly, the stack ejector lid provides three functions: It is part of the compression chamber and part of the ejector while in the vertical position, and the lid pivots to the horizontal position to serve as a walkway for bale loading.

Another novel mechanism controls the raising and lowering of the ejector lid and the locking of that mechanism so as to absorb the high force required to eject the compressed stacks from the compression chamber and delivery chute.

The side and top pressure plates mold the stacks of bales into a generally circular shape which matches the cross sectional shape of the delivery chute, thereby maintaining a tight fit between the compressed stack and the delivery chute. This tight fit ensures that the queue of stacked bales remains pressured while additional bales are being loaded into the compression chamber. This constant pressure keeps all of the stacks in the queue pressed together and prevents the introduction of air between the stacks.

The individual components of the invention are made to function together as a unit capable of bagging or wrapping a very large number of bales with a single equipment operator and one person to assist with the bale loading. For example, 504 bales weighing approximately 50 pounds each can be stacked, compressed and bagged or wrapped in one hour.

The invention will be described below in connection with the following drawings, wherein.

Before proceeding it is pointed out that the term stack and the term rank as used herein are synoymous and are inclusive of: a plurality of rectangular bales positioned one on top of another to form a single vertical column; to a plurality of such columns positioned side-by-side to form a line of columns with adjacent columns substantially engaging one another; and to plurality of such lines of columns with adjacent lines of columns substantially engaging one another.

The equipment is transportable and is preferably towed by a tractor or truck or other power source. In operation, a wagon or truck bearing a load of individual rectangular bales is placed alongside the equipment preparatory to loading the bales into the compression chamber. Bales are then transferred into the compression chamber so as to form an orderly stack. The tread plate is then pivoted upward 90-degrees so as to form a part of the outside face of the compression chamber. The stack is then compressed on the sides and top and bottom while in the compression chamber to thereby shape the rectangular stack into a generally circular convex cross section. The compressed stack is then moved into the delivery chute, which has the same generally circular shape of the compressed stack. A second stack so compressed and moved from the compression chamber forces the first stack rearward toward the open end of the plastic tube which is affixed to the outside of the delivery chute. Subsequent compressed stacks are similarly forced from the compression chamber and the first stack is forced rearward into contact with a backstop. Thereafter, compressed stacks are cleared from the compression chamber by the equipment being moved forward in response to the force of the ejection hydraulic cylinder pushing the stack against the backstop. This process is repeated many times until the last stack is compressed. This last stack is then forced through the delivery chute and into the tube. The plastic tube is then gathered and sealed. Typically, the plastic tube may be from 100 to 200-feet long when finished, and is deployed along the ground in a line. Alternately, the compressed stacks are wrapped in plastic film as they are ejected from the delivery chute.

Figure 1:
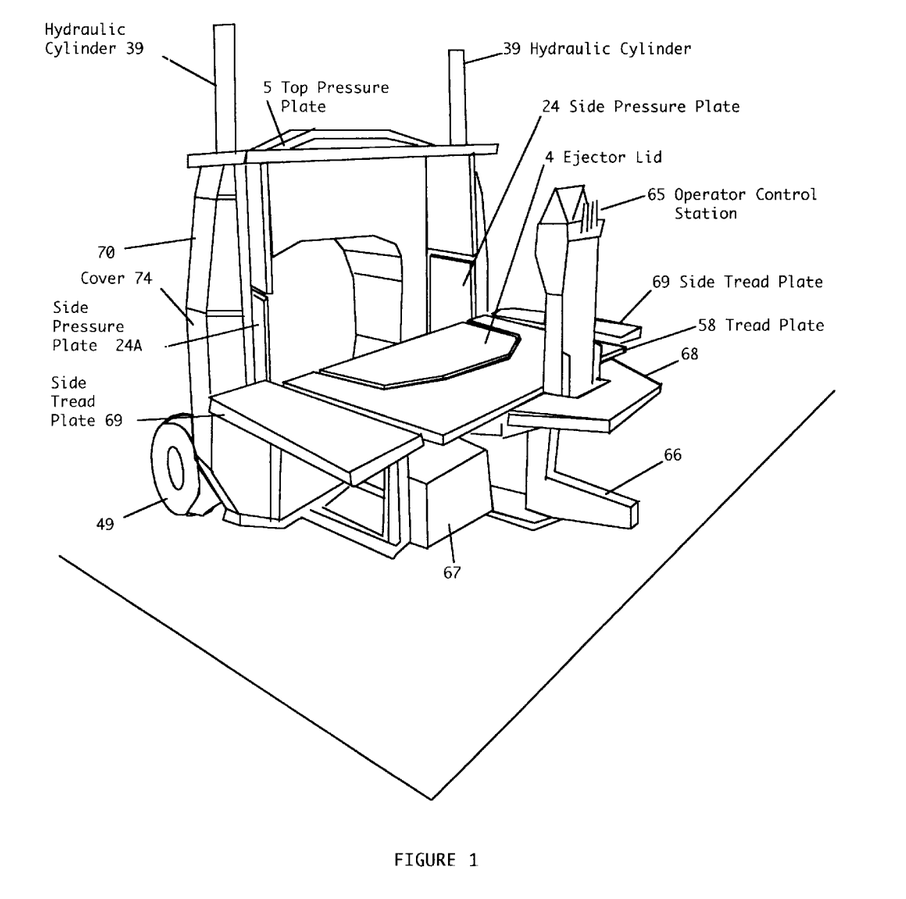
FIG. 1 is an overall perspective view of the bale bagging and wrapping equipment of this invention.

Reference is made to FIG. 1, which is a perspective drawing of the overall equipment of this invention. The equipment is attached to a tractor or truck or the like by tow bar 66 which is adaptable with a suitable hitch to the towing vehicle, which is not shown. A splined shaft or other power transmission means is used to couple the power source to a hydraulic pump located aft of the tow bar 66 but not shown. Tank 67 stores the hydraulic fluid used to power the cylinders used throughout the equipment. Plate 68 is used as the operator tread plate. The plate 68 is removable as an aid to transporting the machine.

Operator control station 65 mounts the various hydraulic and manual controls necessary to activate the cylinders and latches used in the various process steps. Tread plate 58 is shown in the horizontal position, and when pivoted or raised to the vertical position the ejector lid 4 is also raised to the vertical position. Side tread plates 69 provides a walkway during bale processing, and plates 69 can be raised and pivoted to reduce the equipment width while being transported.

Side plates 24 and 24A are shown in the retracted position in which the individual bales can be placed to form stack 12. Cover 74 is a safety shield over the side plate actuating mechanism which causes side plates 24 and 24A to reciprocate in a horizontal direction. The top pressure plate 5 is moved and reciprocated vertically by hydraulic cylinders 39. These cylinders are shown in the raised operable position. For transporting or storing under cover cylinders 39 may be retracted so as to reduce the height overall.

Reference is made to FIGS. 2A through 2F. These figures depict diagramatically the relationship of the main components in compressing and ejecting the stacks of bales.

Figure 2A:
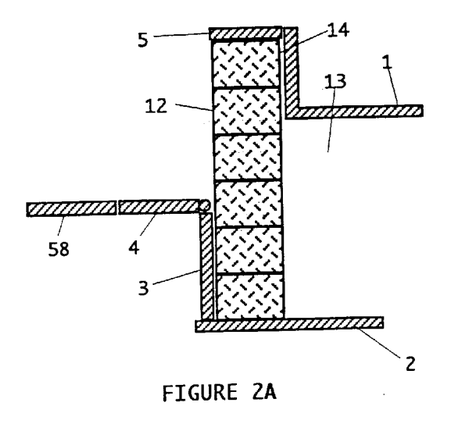
FIGS. 2A through 2E are diagrammatic sectional drawings showing the relative positions of the major components during the various process steps.
Figure 4:
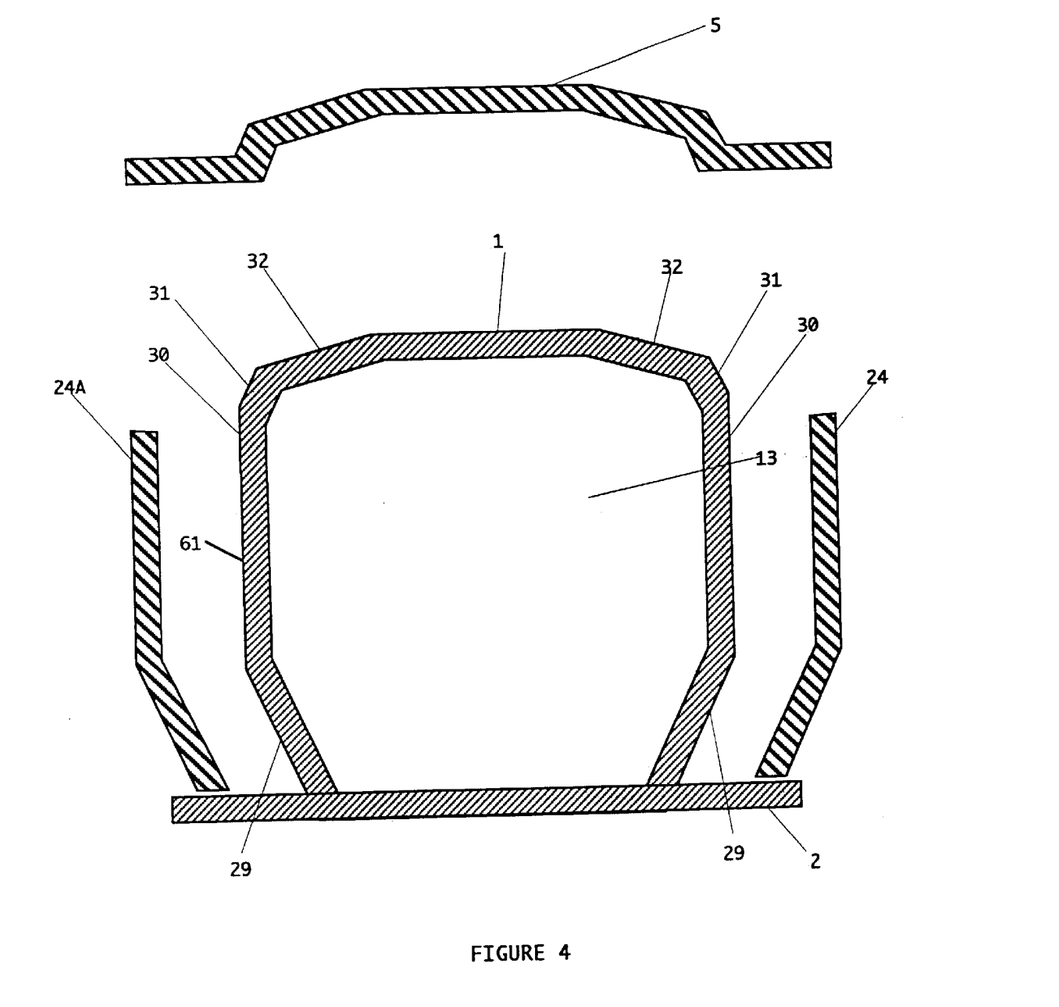
FIG. 4 is a cross sectional drawing showing the generally circular convex shape of the delivery chute, and the corresponding shapes of the pressure plates.

Delivery chute 13 is made up of floor 2 and top section 1 and additional portions shown in FIG. 4. A stack of bales 12 is shown loaded in compression chamber 14 in FIG. 2A. Tread plate 58 and ejector lid 4 are multipurpose members, and are used as a platform for the operator to use when loading bales into the compression chamber 14. After stack 12 is loaded then tread plate 58 is raised to a vertical position by hydraulic cylinders 59 which are not shown. As tread plate 58 is raised lid 4 is thereby raised also. In the vertical position both tread plate 58 and lid 4 functions as a wall of the compression chamber 14. As shown in FIG. 2D, lid 4 also functions as part of the stack ejector mechanism which moves compressed stack 17 into the delivery chute 13. Lid 4 is attached to ejector plate 3 in hinged relationship to permit it to pivot as shown. Top pressure plate 5 is shown in the raised position in FIG. 2A, thereby providing access for bale loading.

Top pressure plate 5 has a concave surface so as to mold or form the top of compressed stack 17 into a corresponding convex shape. The outer ends of top pressure plate 5 are straight and thereby provides surfaces for side plates 24 and 24A to move along as the side plates are reciprocated to compress stack 12.

Side pressure plates 24 and 24A are also concave so as to mold the sides of stack 12 into a convex shape so as to fit snugly within the delivery chute 13 and so as to provide a shape around which the plastic sheath can fit without air entrapment.

Figure 2B:
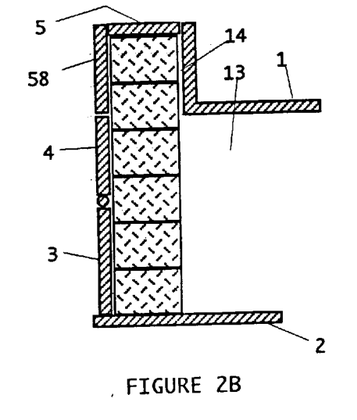
Figure 2C:
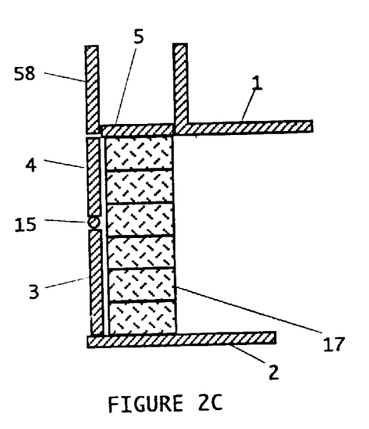
Figure 2D:
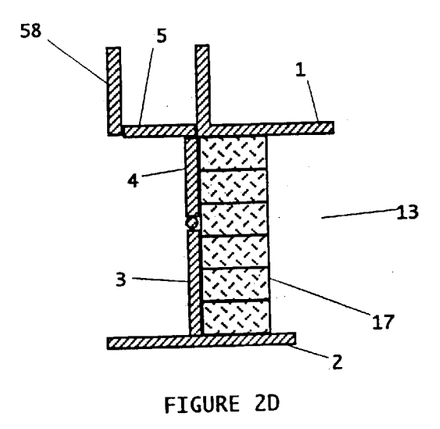
Figure 2E:
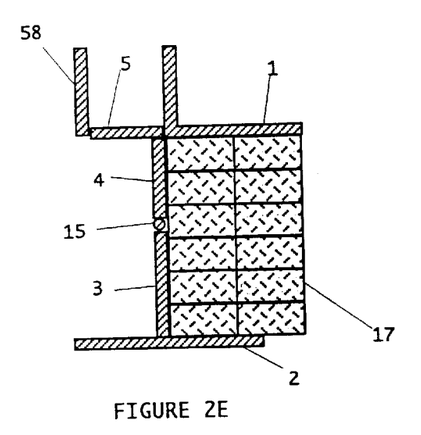

In FIG. 2B tread plate 58 has been pivoted 90 degrees so as to form the front face of the compression chamber 14. In FIG. 2C pressure plate 5 has been lowered and stack 12 has been compressed is now as shown as compressed stack 17. In FIG. 2D the ejector plate 3 and lid 4 has moved rearward so as to move stack 17 to the threshold of delivery chute 13. FIG. 2E shows a second compressed stack 17 has pushed the first stack 17 to the rear of delivery chute 13. In FIG. 2F 4 compressed stacks form a queue in which 2 stacks or ranks have cleared the delivery chute 13.

Figure 3:
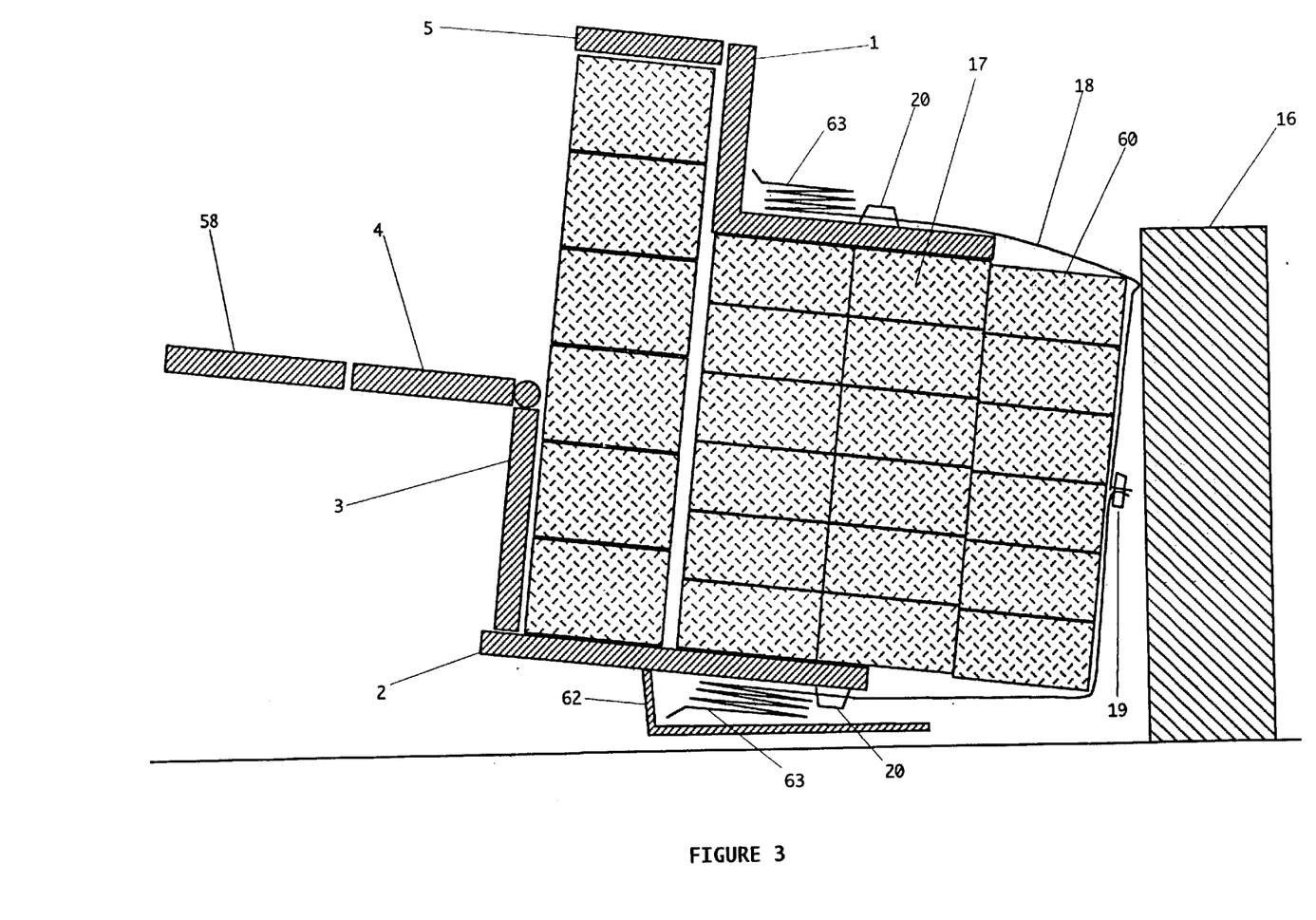
FIG. 3 is a diagrammatic sectional drawing showing compressed stacks being inserted in an elongated plastic tube.

Reference is made to FIG. 3 which shows a stack of compressed bales which have been inserted into the elongated plastic tube. A backstop 16 is temporarily emplaced so as to stop the further rearward movement of ejected compressed stack 60. Plastic tube 18 is shown folded accordian style and emplaced around the outer surface of the delivery chute 13 and affixed thereto by shockcord 20. The end of tubing 18 is shown gathered and sealed with twine 19. Stack 60 is subsequently forced into contact with backstop 16 and the rearward movement of the stacks will end. Thereafter, when compressed bales are cleared from the compression chamber, the stacks remain stationary with respect to the backstop and the equipment and tractor are forced to move forward a corresponding distance. Throughout this disclosure the stack of bales 17 are said to be ejected from the compression chamber by the ejector plate 3. This convention is also followed for the steps occurring after the first stack 60 has been stopped by backstop 16 and the stacks are subsequently cleared from the compression chamber by moving the compression chamber forward while stacks 17 and 60 remain substantially fixed in location relative to backstop 16. After a predetermined number of stacks have been inserted into the tube the backstop is no longer needed and may be removed. Thus, the compressed stacks 17 and 60 are now compressed on the front and rear faces and the formation of air pockets between adjacent stacks is thereby prevented. Compressed stacks 17 and 60 remain tightly compressed due to the tight fit of the compressed stacks in the delivery tube. Thus, the compressed stacks 60 within the plastic tube 18 exerts a compression force against the compressed bales within the delivery chute 13. There would be a tendency for the queue of bales to rebound back into the compression chamber, but this undesirable movement is prevented by the tight fit between the compressed bales 17 and the delivery chute surfaces.

Plastic tube 18 is typically made of polyethylene film about 0.0075 inches thick and is commercially available. Thus, the shape of the compressed stacks 17 largely determines the cross sectional shape of stacks 60, and the shape of stack 60 determines to a large extent the amount of air undesirably remaining in the tube 18. Therefore, the generally circular convex shape of the compressed stack 17 serves to minimize the amount of air retained within the tube along with the hay. When the compressed stacks are wrapped in plastic, a commercially available polyethelyne film can be used. This film may be about 0.001 inches thick and applied in an overlapping spiral having a build up of about 0.004 inches thick.

FIG. 4 shows the shape of the delivery chute 13 in cross section. FIG. 4 also shows that the side plates 24 and 24A have the same cross sectional shape. The correspondence between the cross sectional shape of top pressure plate 5 and the upper portion of the delivery chute 13 is also shown. The periphery of the delivery chute 13 is shown by lead-line 61, which is made up of segments 29, 30, 31, 1, and floor 2. The generally circular concave shape of the compression chamber and delivery chute effectively extrudes the compressed stacks into the tube in a similar shape, and this shape produces a taut tube with a minimum of exposed flat surfaces. Exposed flat surfaces tend to allow the plastic to flutter in the wind, and this can pump air in through small cuts or pinholes and thereby increase the probability of mold occurring. Thus, the cross sectional shape depicted in FIG. 4 produces a taut plastic tube or plastic wrap which resists fluttering. Throughout this disclosure the term generally circular shape is used to describe the concave cross sectional shape of the delivery chute 13 and convex cross sectional shape of the compressed stacks 17. This term includes other delivery chute concave shapes, such as circular pipe-like structures, polygonal structures, and other shapes which eliminates sharp corners in compressed stack 17 and which prevents large flat surfaces in the compressed stack. The inventive method and apparatus compresses the stack of bales in a manner depicted by the overlaying of the stack outline onto the delivery chute cross section shown in FIG. 5.

Figure 5:
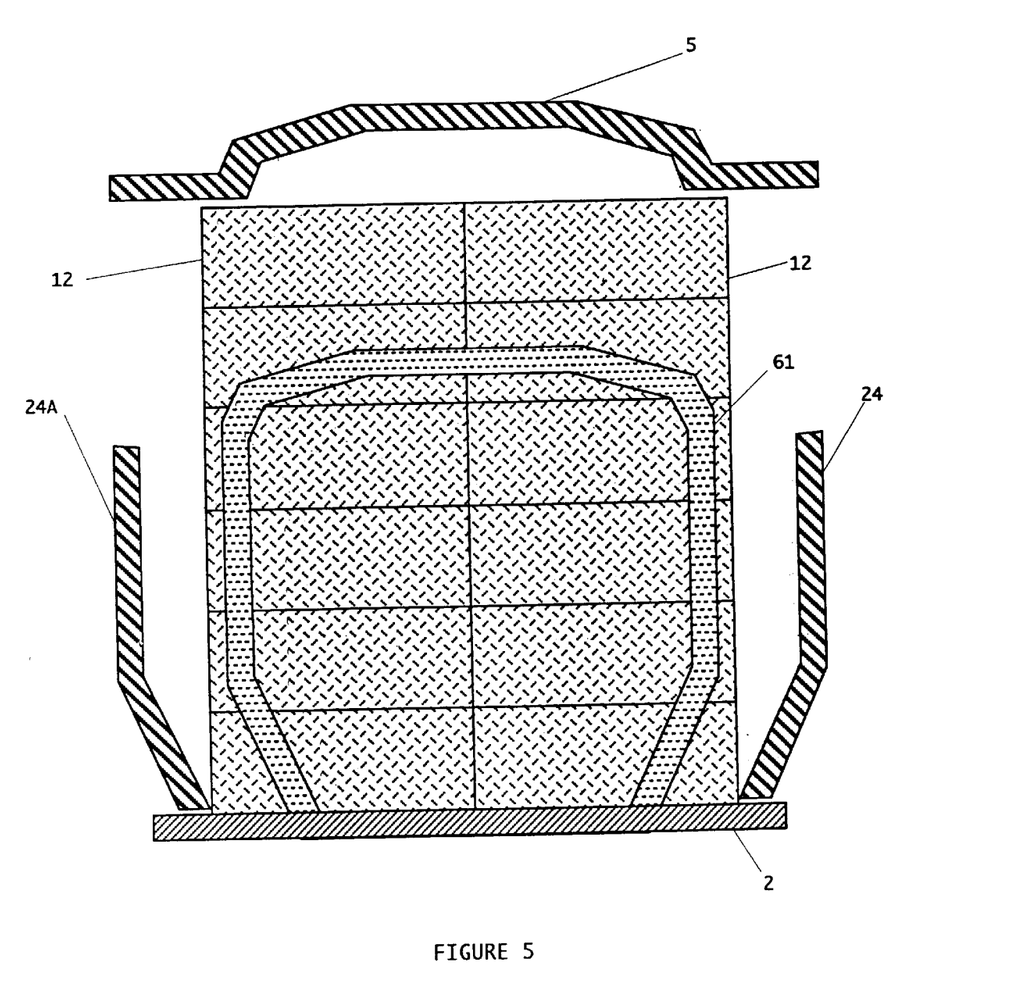
FIG. 5 is a cross sectional drawing showing the relationship of the pressure plates and the uncompressed stack of bales.

Reference is made to FIG. 5, which is a sectional drawing in profile through the compression chamber 14. Stack 12 is shown comprising 12 rectangular bales; 2 bales end to end across the width of the compression chamber 14 and 6 bales high. This configuration is the preferred stack configuration when stacking rectangular bales having approximate dimensions of 14×20×36-inches. This 12-bale stack is shown for reference purposes only and should not be considered limiting, as other bale sizes and stacking configurations can be accommodated by the methods and apparatus of this invention. Other stacking configurations which can be used, for example, include two ranks of 12 bales each placed in a larger compression chamber. Another viable stacking arrangement consists of 4 bales across and 6 bales high with the bale long axis parallel to the tube main axis. Whatever stacking arrangement is selected it is important that the stacking be orderly and without large gaps between individual bales which could result in voids in the compressed stack 17.

Figure 8A:
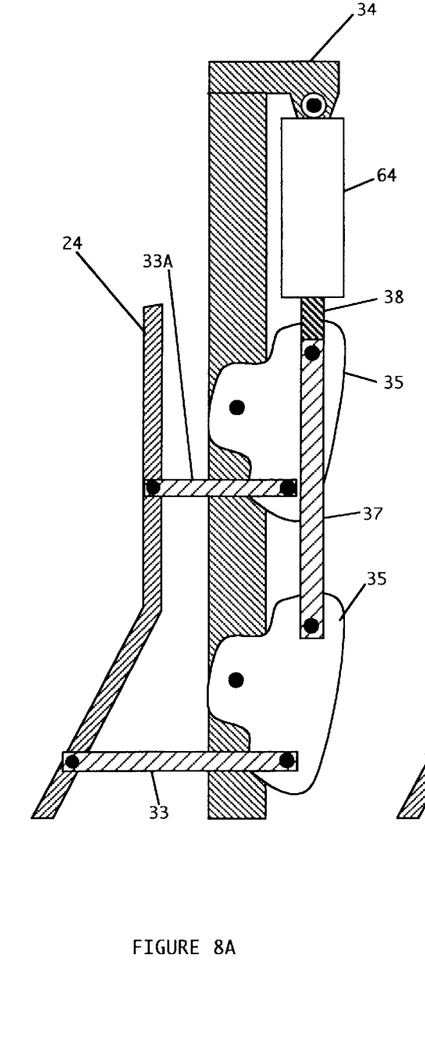
FIGS. 8A and 8B are elevation drawings showing the cams and linkage which reciprocates the side pressure plate.
Figure 8B:
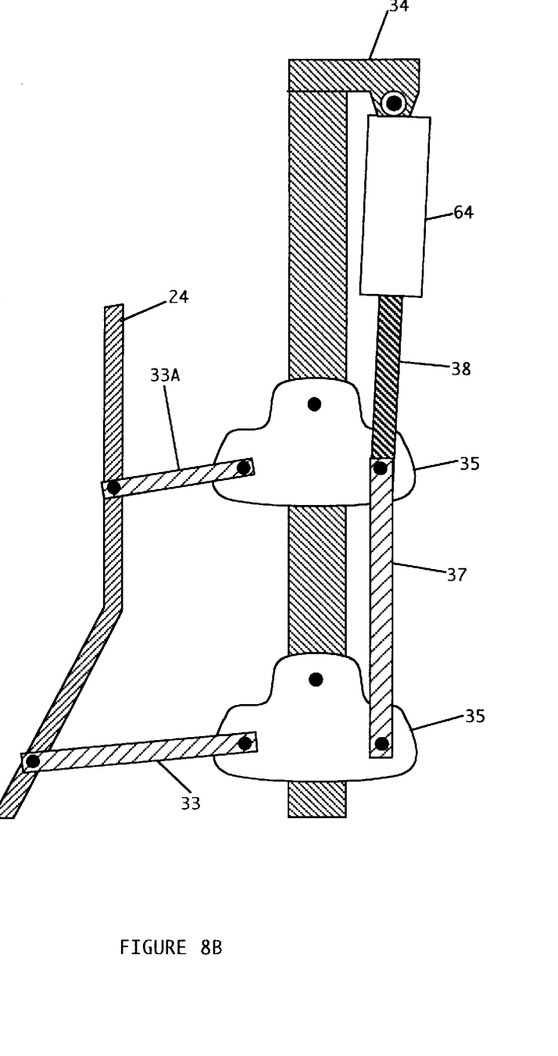

Side plates 24 and 24A are reciprocated in a horizontal direction to thereby compress and mold stack 12 when pressured by cams 25, shown in FIGS. 8A and 8B. Similarly, top pressure plate 5 is reciprocated vertically to compress and mold stack 12 into the shape of the delivery chute top section.

Figure 6:
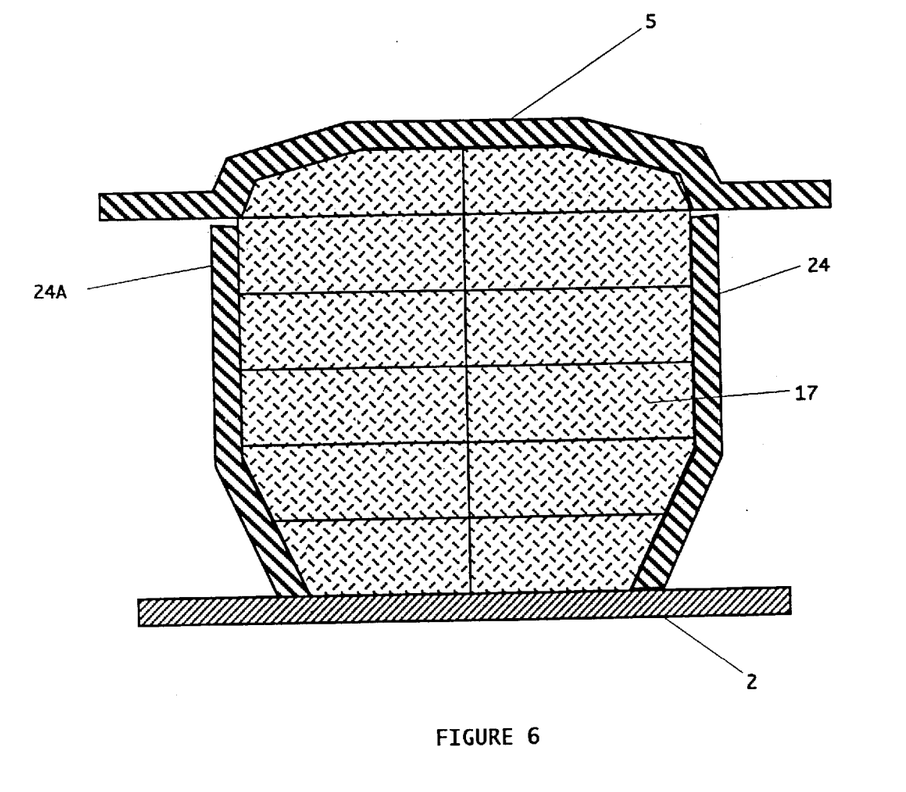
FIG. 6 is a cross sectional drawing showing a compressed stack of bales in the compression chamber.

In FIG. 6 the side and top pressure plates are shown in the closed position and compressed stack 17 is now in the same cross sectional shape as the delivery chute 13. Top pressure plate 5 is preferably activated before side pressure plates 24 and 24A. Side pressure plates 24 and 24A may be operated before top pressure plate 5 but this configuration undesirably extends the length of the side pressure plates which would then have to extend to the full height of stack 12. Thus, comparing the dimensions of compressed stack 17 with the dimensions of compressed stack 17 it can be seen that the already compressed individual bales have been further compressed. It has been found that when stack 12 is compressed so that when the stack height has been reduced by the order of 15 percent then the trapping of excess air in the plastic sheathing is less likely to occur. Similarly, the horizontal width of stack 12 should be reduced by the order of 15 percent.

Figure 7:
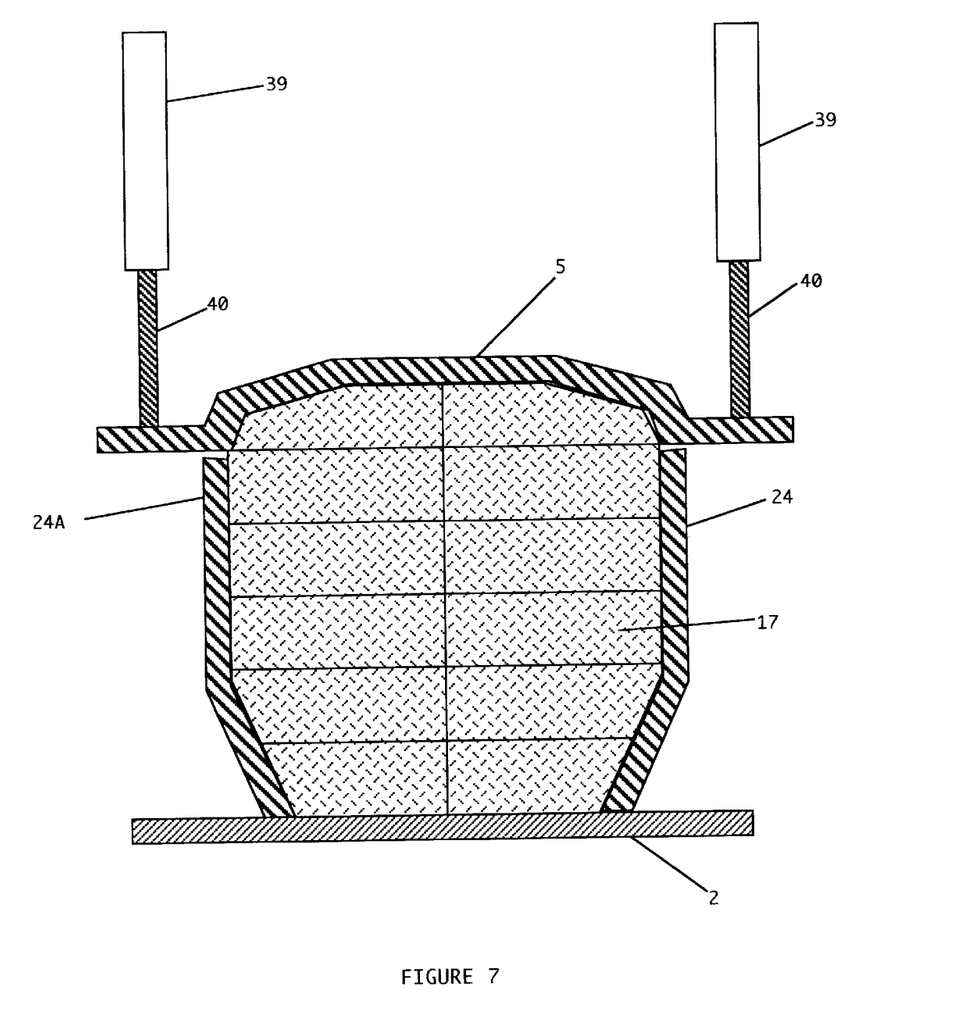
FIG. 7 is a sectional drawing showing the hydraulic cylinders which reciprocates the top pressure plate.

FIG. 7 shows top pressure plate 5 being activated by hydraulic cylinders 39 and hydraulic cylinder rods 40. One side plate may be fixed, if desired, and the one moveable side plate will then move through a greater distance in order to provide the same amount of stack compression as would be obtained with two moveable side plates.

Reference is made to FIGS. 8A and 8B which are sectional drawings showing the side pressure plate 24 and the mechanism for moving the plate. Hydraulic cylinder 64 is mounted in a generally vertical orientation on the support member 34 and the hydraulic cylinder rod 38 is shown in the extended position in FIG. 8B and in the retracted position in FIG. 8A, thereby initiating movement which reciprocates side pressure plate 24 to compress and shape stack 12 horizontally. When cylinder rod 38 is retracted then side pressure plate 24 is retracted so as to make room for another stack of bales in the compression chamber 14. Cams 35 are coupled together by cam linkage 37, which forces the lower part of side compression plate 24 to compress stack 12. Side compression plate linkage 33 and 33A transmits the force generated by hydraulic cylinder 64 to the side pressure plate 24, and allows the side pressure plate to slide freely within a slot in floor 2. Thus it can be seen that with hydraulic cylinder rod 38 fully extended the side pressure plate is also fully extended so as to compress stack 12. When the hydraulic cylinder rod 38 is fully retracted then side pressure plate 24 is also fully retracted. Thus, the mechanism shown in FIGS. 8A and 8B minimizes the equipment width and thereby improves over-the-road safety as the equipment is significantly narrower than would be the case if the hydraulic cylinder were mounted horizontally. The cam and linkage mechanism thereby allows the stack 12 width to consist of two bales placed end to end, and to still meet overall width requirements for safely transporting over public roadways. Further, the invention affords the advantage of powering both ends of side pressure plate 24 using a single hydraulic cylinder 37.

Stack 12 is compressed so as to form compressed stack 17 by activating the hydraulic cylinders, using the control levers located at the operator control station 65, shown in FIG. 1. After bale 17 is compressed on four faces; top, bottom, and both sides, the ejector plate machanism is activated so as to clear the compressed stack 17 from the compression chamber by moving the stack into the delivery chute 13.

Figure 9:
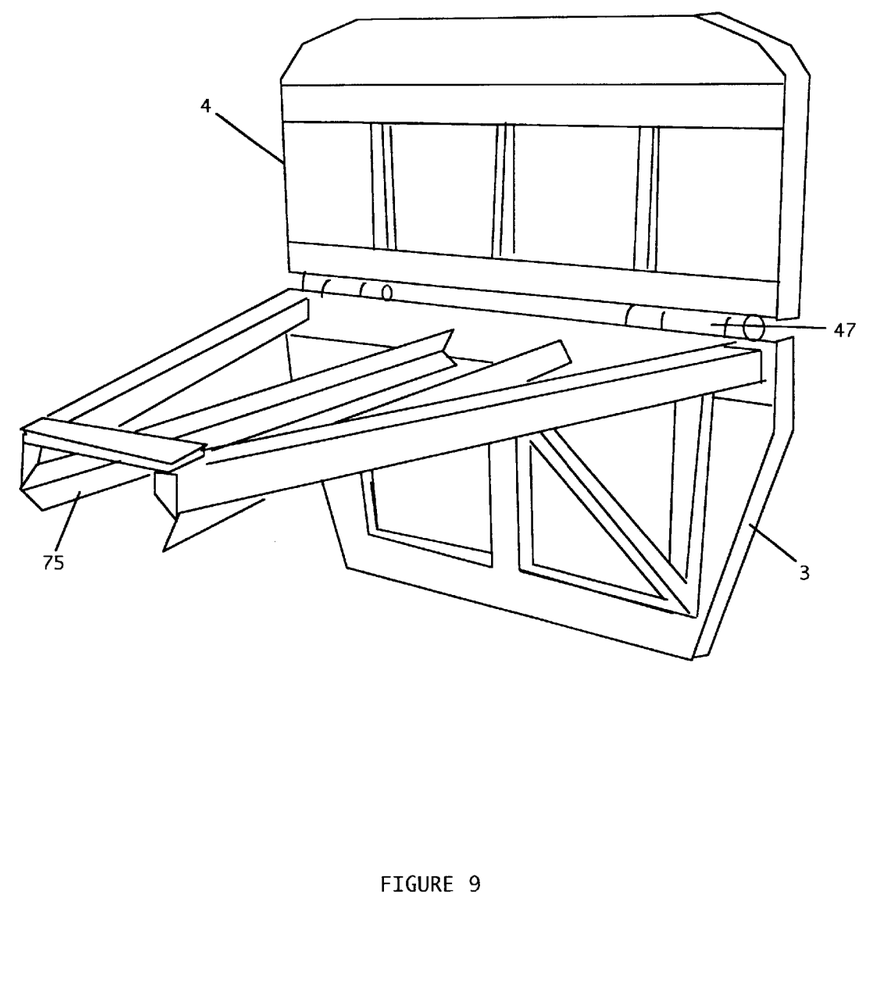
FIG. 9 is a perspective drawing of the ejector mechanism.

Reference is made to FIG. 9, which is a perspective drawing of the ejector mechanism. The assembly is moved along floor 2, not shown. Reference is made to FIGS. 11A through 11D which shows the position of the ejector mechanism in effecting the movement of the stacks 12. Thus, in FIG. 9 the ejector lid 4 is pivotable about ejector plate 3 by hinge 47. The assembly is supported by floor 2 and by rails 55, which support rails 75. While not shown in the figures, the major sliding surfaces are faced by a plastic pad so as to reduce the force required to move the parts and to provide a long lived mating surface. Thus, rails 75 and ejector plate 3 are so provided with plastic sliding surfaces. In addition the side and top pressure plates may be so equipped with plastic sliding surfaces. A polyethylene plastic can be used.

Figure 10A:
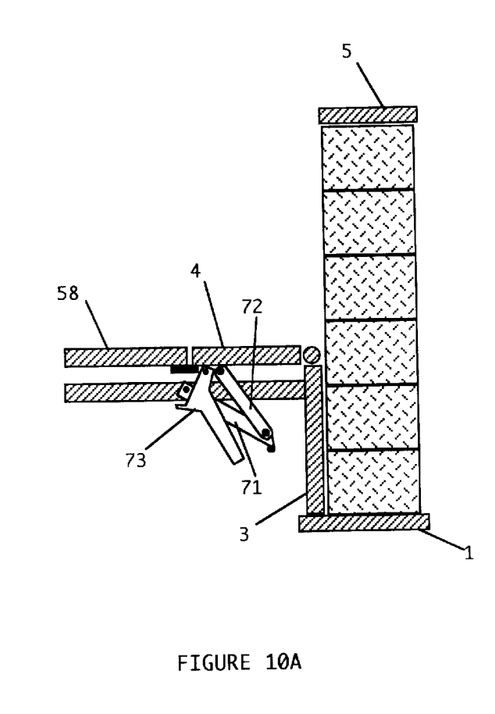
FIGS. 10A through 10C are side elevation showing the folding supports for raising and lowering the ejector lid.
Figure 10B:
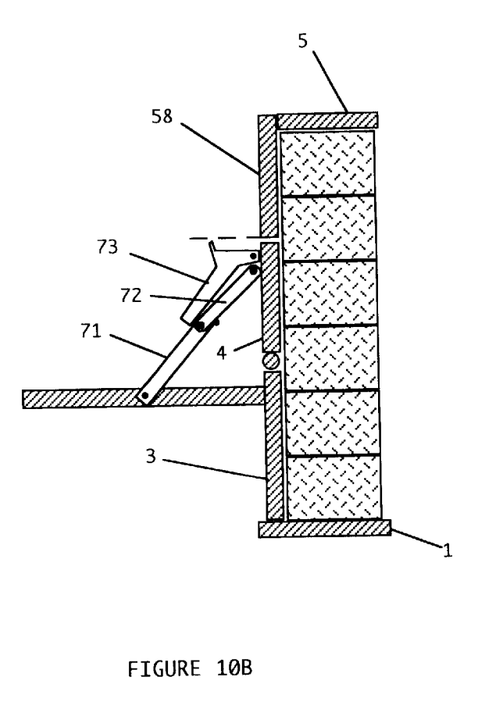
Figure 10C:
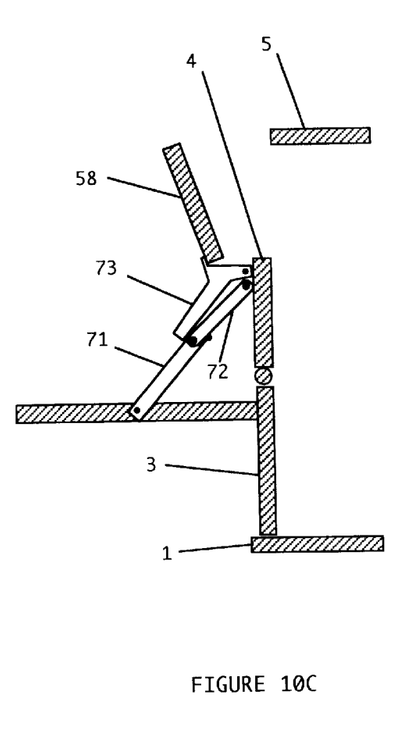

Reference is made to FIG. 10 which is a side elevation of the ejector plate 3 and ejector lid 4 and the mechanism for locking the ejector lid 4 into position so as to move stack 12 toward the rear. In FIG. 10B the three principal parts are shown in the locked position. Lower arm support 71 cooperates with upper arm 72 to form a strong support for lid 4 which absorbs a significant portion of the force required to force stack 12 from the compression chamber. In FIG. 10C the tread plate 58 is being lowered and thereby engages the lip on actuator 73 and lower arm 71 is forced downward into a collapsed or folded position as shown in FIG. 10A. In this folded position lid 4 and tread plate 58 now form a walkway for operating personnel use.

Figure 11A:
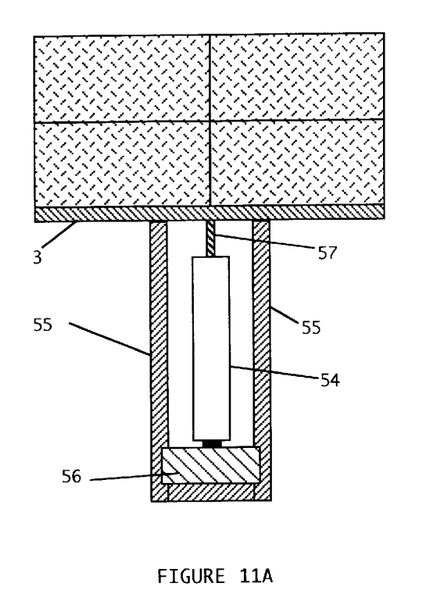
FIGS. 11A through 11D are plan views showing the ejector cylinder positions for moving the compressed stacks into and through the delivery chute.
Figure 11B:
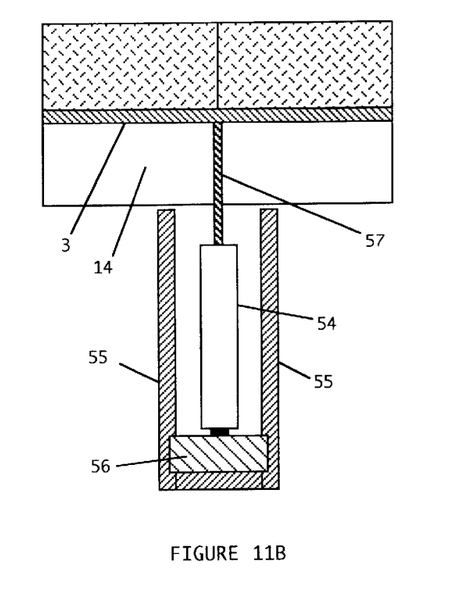
Figure 11C:
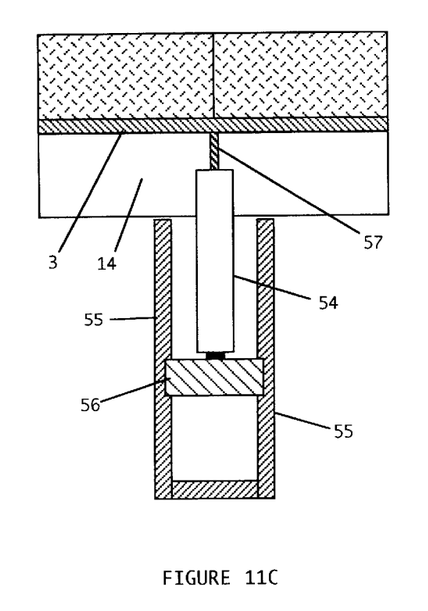
Figure 11D:
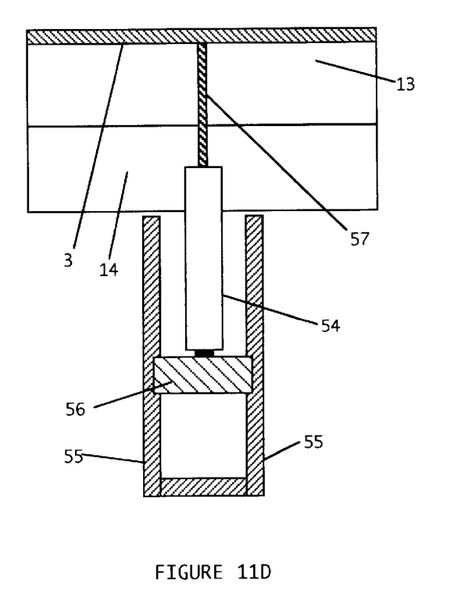

Reference is made to FIGS. 11A and 11B. These figures are plan views of a portion of the ejector mechanism showing how the ejection cylinder is moved rearward so as to clear the last stack of bales from the compression chamber and the delivery chute. Hydraulic ejector cylinder 54 is secured between mounting rails 55, with the cylinder body secured to cylinder anchor box 56. Ejection cylinder anchor box 56 is slideable along rails 55 so as to engage stops at the appropriate locations. In FIG. 11A the anchor box 56 is at the forward location such that when the cylinder rod 57 is retracred then ejector plate 3 is located just forward of the compression chamber 14. When cylinder rod 57 is in the extended position in FIG. 11A the ejector plate 3 is moved to a position just inside the delivery chute 13. Thus, anchor box 56 is positioned in FIG. 11A so that stacks 17 are moved from the compression chamber 14 to the delivery chute 13. When the final stack 17 has been compressed, that stack will be cleared from both the compression chamber 14 and delivery chute 13. This operation is accomplished as follows: The stack 12 is first moved into the delivery chute 13 as shown by the dotted lines indicating the extended position of hydraulic cylinder rod 57. Hydraulic cylinder 54 and anchor box 56 are both moved to the rearward position shown in FIG. 11B. This movement is accomplished by stopping the movement of ejector plate 3 at its position shown. in FIG. 11A, and while so stopped the cylinder rod 57 is retracted and the cylinder 54 and anchor plate 56 is thereby pulled to its rearward position shown in FIG. 11B and locked into position there. The compressed stack 17 is now ejected from the delivery chute 13 by extending cylinder rod 57 to the rearward position shown in FIG. 11B. Thus the ejector mechanism of this invention utilizes a short hydraulic cylinder 54 to move a stack 17 over a much greater distance than the length of the cylinder 54, thereby effecting economies and reducing the length of the equipment. After the last stack 17 has been ejected, the anchor box 56 and ejector cylinder 54 is returned to its position shown in FIG. 11A.

Figure 12:
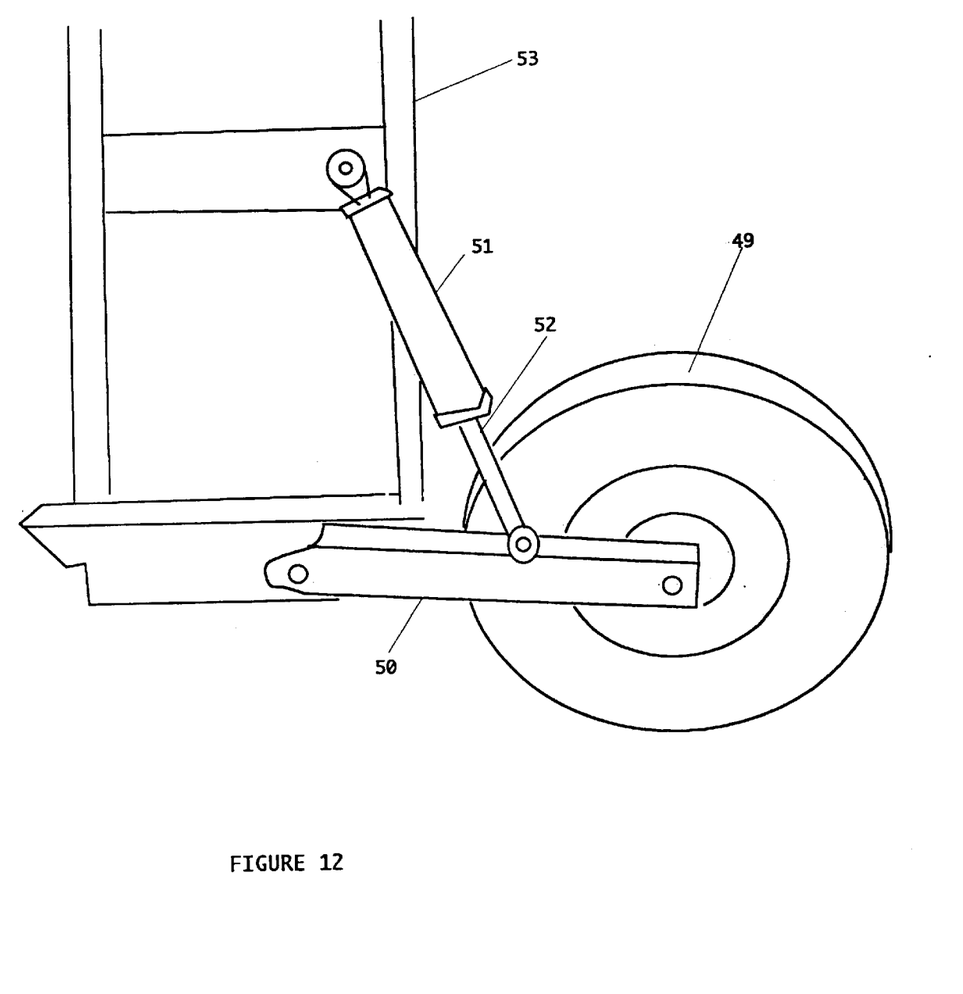
FIG. 12 is a perspective drawing of the wheel, its supporting member, and the hydraulic cylinder used to adjust the ground clearance.

Reference is made to FIG. 12, which is a perspective drawing of the overall equipment raising and lowering mechanism. The perspective drawing is shown from the center of the equipment looking outward. It is desirable that the equipment ground clearance be adjustable so as to be transportable and so as to also provide the desired distance that the ejected stacks are lowered when being sheathed in the protective plastic covering. Thus, wheel 49 is mounted on strut 50, which is capable of pivoting as the hydraulic rod 52 is extended or retracted in response to the movement of the raise/lower control lever on the operator control panel. Hydraulic cylinder 51 and strut 50 are mounted onto frame 53. Hydraulic cylinder rod 52 is extended in order to increase the ground clearance of the equipment and retracted to decrease the ground clearance.

The equipment is towed and powered by a tractor or truck or the like. In the preferred embodiment the tractor Power Take Off (PTO) is connected to the equipment via a splined shaft, which drives a hydraulic pump, which, in turn, supplies hydraulic fluid under high pressure to power the various hydraulic cylinders. Some tractors or trucks may have its own supply of pressurized hydraulic fluid which could be used to power the equipment, and thereby eliminate the need for the aforementioned hydraulic pump.

The pressurized hydraulic fluid from the pump is routed to an operator control station 65, from which location the operator controls the various operational steps via a number of control levers. These levers control the ground clearance; the raising and lowering of the lid/platform; the raising and lowering of the top compression plate; the left and right movements of the side pressure plates; and the fore and aft movement of the ejector assembly. A manually operated lever is provided to unlock the anchor box 56 so that cylinder 54 can be moved rearward preparatory to ejecting the last stack from the delivery chute.

The equipment provides for compressing the stack of bales on all six sides. The stack 12 is compressed on top and bottom and two sides while in compression chamber 14 and the front and back surfaces of the compressed stack 17 are then compressed by the ejector plate 3 and 4. Therefore, excess air is squeezed from the compressed stacks.

The device of this invention was used to insert 504 bales of alfalfa into an elongated plastic tube in one hour. The alfalfa was cut and then baled within several hours to thereby form individual rectangular bales 14×20×36-inches long. The moisture content was in the range of 40 to 60 percent, and the individual bales were bound with twine. The bales were loaded onto a wagon and moved to a position alongside the equipment of this invention. The equipment was powered by a tractor having a PTO. Power was supplied to the equipment via a splined shaft, and the shaft was connected to the hydraulic pump on the disclosed equipment, to thereby produce a pressure of about 1800-PSI. A plastic tube 6.5 feet in diameter was affixed to the outside of the delivery chute so that as the ranks of compressed stacked bales exited the delivery chute they were forced into the plastic tube. The ground clearance of the delivery chute was ajusted by activating the hydraulic cylinders connected to the two wheels. A backstop was placed just aft of the delivery chute. The open end of the tube was gathered and tied with twine to form an airtight seal. The bales were then discharged into the tube one rank or stack of 12 bales at a time.

The tread plate was pivoted to a horizontal position so as to provide a walkway to assist in bale loading. The two side walkway plates were lowered so as to provide additional walkway area. The equipment was manned by one operator and one bale loading person. The individual bales were placed in the compression chamber to form a stack of 12 bales, consisting of two bales placed end to end across the width of the machine and 6 bales high. The tread plate was then pivoted 90-degrees to the vertical position and the ejector lid was thereby also raised to a vertical position by the pivoting tread plate. The tread plate and the ejector plate thereby formed the forward face of the compression chamber. The stack was compressed by activating the side and top pressure plates. While so compressed it was observed that the compressed bales had the same outside shape as the delivery chute, and that there were no voids or gaps between the adjacent bales. The ejector was then activated to force the compressed stack into the delivery chute, but not through the chute. The ejector was withdrawn from the delivery chute to its forwardmost position for chamber loading. The tread plates were lowered into a horizontal position and another stack of bales were loaded into the compression chamber and compressed as just described. This second stack was ejected from the compression chamber and thereby forced the first stack into the tube and into contact with the backstop. The third compressed stack was cleared from the compression chamber in a different manner. Since the backstop prevented the rearward movement of the three stacks, the equipment was forced to move forward by the reaction of the ejector cylinder. This procedure was repeated until all bales were loaded and compressed. The last stack was ejected into the plastic tube by moving the ejector through the length of the delivery chute. This step was accomplished by the operator as follows. First, after compressing the last stack in the compression chamber the operator moved the ejector rearward so as to move the compressed stack to the threshold of the delivery chute. The operator then depressed a lever which freed the ejector cylinder anchor box from its forward locked position. The ejector cylinder rod was retracted while the ejector was held fixed, so that the ejector cylinder was pulled rearward to a second locked position. The last compressed stack was then ejected into the plastic tube by extending the ejector cylinder rod. Thus, the effective throw distance of the ejector was doubled compared to the actual cylinder rod displacement.

The plastic tube was gathered tightly around the last stack and made airtight with twine. The tube was thereby filled with 504 bales stacked in 42 ranks of 12 bales in each rank. The elapsed time was one hour. The stacks formed a line about 65 feet long.

Preparatory to moving the equipment to another site the hydraulic cylinders driving the top pressure plate were lowered from the high operational position to a lowered position so as to reduce the equipment height, thereby improving over the road safety. Similarly, the equipment ground clearance was increased by extending the hydraulic cylinder rods attached to the wheel struts.

Before closing, I want to amplify the comments above that the invention contemplates providing the protective plastic sheath not only in the form of a bag but also in the form of a wrapping. For the latter purpose, the structure of a conventional ring-like wrapper normally used for wrapping end-to-end round bales is employed. Typical equipment is noted below.

In lieu of being pushed into a bag, the horizontally moving stacks are pushed into and through the center of a ring-type wrapper mounting a pair of rolls of plastic which are orbited around the periphery of the stack. With one end of each roll held fast, the wrap is laid down on the surface of the stack. The first portion of the stack to enter the ring is maintained against falling to the ground by being appropriately supported (cantilevered or rods). However, as the number of stacks increases the part of the stack being wrapped is caught between the forward pressure of the stack pusher and the resistance pressure of the wrapped stacks and such support is no longer required. The forward end of the initial part of the stack to be wrapped is covered with a cap the skirt of which is covered with wrapping. The trailing end of the final part of the stack is likewise provided with a cover.

What I claim is:

1. A machine to arrange a plurality of rectangular bales of hay in a compressed stack for purposes of being covered with protective plastic, comprising:

means for receiving a plurality of rectangular bales of hay and positioning the bales in a vertically oriented stack;

a top pressure plate extending over a top of the stack and mounted for vertical reciprocating motion relative to the stack;

means for reciprocating said top pressure plate and moving the pressure plate down into engagement with top of the stack and continuing the downward motion to compress the stack;

a first side pressure plate extending adjacent a first side of the stack and mounted for horizontal reciprocating motion relative to the stack;

first means operable when said top pressure plate is engaged with and has compressed said stack;

said first means being for use in moving said first side pressure plate into engagement with said first side and continuing the motion to compress the stack;

a second side pressure plate extending adjacent a second side of the stack and mounted for horizontal reciprocating motion relative to the stack;

second means operable when said top pressure plate is engaged with and has compressed said stack; and said second means being for use in reciprocating the second side pressure plate into engagement with said second side and continue the motion to compress the stack.

2. A machine to arrange a plurality of rectangular bales of hay in a compressed stack for purposes of being covered with protective plastic, comprising:

means for receiving a plurality of rectangular bales of hay and positioning the bales in a vertically oriented stack, top, bottom and opposite first and second sides of the stack being flat;

a top pressure plate extending over the top of the stack and mounted for vertical reciprocating motion relative to the stack, the top pressure plate having a concave surface which faces the top of the stack;

means for reciprocating said top pressure plate and moving the pressure plate down into engagement with top of the stack and continuing the downward motion to compress the stack and form the top with a convex contour;

a first side pressure plate extending adjacent said first side of the stack and mounted for horizontal reciprocating motion relative to the stack, the first side pressure plate having a concave surface which faces said first side of the stack;

first means operable when said top pressure plate is engaged with and has formed said top with a concave contour;

said first means being for use in moving said first side pressure plate into engagement with said first side and continuing the motion to compress the stack and form the first side with a convex contour;

a second side pressure plate extending adjacent said second side of the stack and mounted for horizontal reciprocating motion relative to the stack, the second side pressure plate having a concave surface which faces the second side of the stack;

second means operable when said top pressure plate is engaged with and has formed said top with a concave contour; and said second means being for use in reciprocating the second side pressure plate into engagement with said second side and continue the motion to compress the stack and form the second side with a convex contour.

3. The machine of claim 2 further including:

pusher mechanism operable after said top pressure plate and first and second side pressure plates have operated to form said top, and said first and second sides respectively with convex surfaces to move the stack in a horizontal direction to position the stack to be covered with said plastic.

4. The machine of claim 2 further including an open delivery chute having substantially the same cross sectional shape as the cross sectional shape of the stack compressed by said top and first and second side pressure plates to receive the compressed stack when moved in said horizontal direction by said pusher mechanism.

5. The machine of claim 3 further including means on said delivery chute to support an open end of an elongated bag made of protective plastic.

6. A bale stacking device for receiving individual rectangular bales of hay and forming a stack of compressed bales in a delivery chute, comprising A reciprocating top pressure plate, At least one reciprocating side pressure plate, A compression chamber with said pressure plates spaced apart therein sized to compress a stack of said individual bales loaded into said compression chamber, Hydraulic cylinders coupled to said pressure plates, A delivery chute spaced adjacent said compression chamber, A compressed stack ejector, and An operator control station, wherein said cylinders force said pressure plates to compress said stack to thereby shape said stack so as to fit within said delivery chute, said ejector being moveable to push said shaped compressed stack through said delivery chute.

7. The bale stacking device according to claim 6 wherein said top pressure plate is shaped to form the compressed stack into a shape to fit within said delivery chute.

8. The bale stacking device according to claim 6 wherein said top pressure plate is moveable through a vertical distance to thereby compress and reduce the height of said stack by at least 15 percent in the vertical direction.

9. The bale stacking device according to claim 6 wherein said hydraulic cylinder moving said top pressure plate has a locked position for powering said top pressure plate and a lower non-operational position.

10. The bale stacking device according to claim 8 wherein said top pressure plate compresses said stack in the vertical direction prior to said side plates compressing said stack in the horizontal direction.

11. The bale stacking device according to claim 6 wherein said side pressure plate has a shape corresponding to the shape of the side of said delivery chute.

12. The bale stacking device according to claim 6 wherein said side pressure plate is moved horizontally by a vertically mounted hydraulic cylinder.

13. The bale stacking device according to claim 12 wherein said vertically mounted hydraulic cylinder is coupled to said side pressure plate by force translating cams.

14. The bale stacking device according to claim 6 wherein said side pressure plate is moveable through a distance that compresses said stack to thereby reduce said stack width by at least 15 percent in the horizontal direction.

15. The bale stacking device according to claim 6 wherein said moveable side and top plates shape said compressed stack into a convex shape.

16. The bale stacking device according to claim 6 wherein a front face of said compression chamber pivots so as to form a tread plate.

17. The bale stacking device according to claim 6 wherein said ejector has a pivoting lid portion, said lid serving as an ejector surface in a vertical position and which serves as a walkway when in a horizontal position.

18. The bale stacking device according to claim 6 wherein said compression chamber is sized to hold one or two stacks of said individual bales.

19. The bale stacking device according to claim 6 wherein said compression chamber is sized to hold a stack of said individual bales stacked to a height of six bales.

20. The bale stacking device according to claim 6 wherein said compression chamber is sized to hold a stack of said individual bales with two bales placed end to end across the width of said chamber.

21. The bale stacking device according to claim 6 wherein said top and side pressure plates are contoured to thereby shape the stack of bales into the shape of said delivery chute.

22. The bale stacking device according to claim 6 wherein said delivery chute has a generally circular concave internal cross sectional shape.

23. The bale stacking device according to claim 6 wherein a plastic tube is mounted on said device so as to receive compressed stacks ejected through said delivery chute.

24. The bale stacking device according to claim 6 wherein said compressed stack ejector is actuated by a hydraulic cylinder having a forward locked position and a rear locked position.

25. The bale stacking device according to claim 24 wherein said compressed bale ejector is advanced rearward to clear said compressed stack from said compression chamber into the threshold of said delivery chute when said ejector cylinder is in the forward locked position.

26. The bale stacking device according to claim 24 wherein said compressed stack ejector is advanced rearward to force said compressed stack through said delivery chute when said ejector cylinder is in the rearward locked position.

27. The bale stacking device according to claim 6 wherein said operator control station has levers for advancing and retracting the rods of said hydraulic cylinders.

28. The bale stacking device according to claim 24 wherein said operator control station has a linkage to select the forward or rearward locked position of the compressed stack ejector hydraulic cylinder.

29. The bale stacking device according to claim 6 wherein said ejector slides on a plastic surface.

* * * * *